United States Patent
Hennings et al.

[11] Patent Number: 5,841,625
[45] Date of Patent: Nov. 24, 1998

[54] CERAMIC MULTILAYER CAPACITOR

[75] Inventors: Detlev Hennings; Herbert Schreinemacher, both of Aachen, Germany; Henricus H.M. Wagemans, Heijthuijsen, Netherlands

[73] Assignee: U.S. Phillips Corporation, New York, N.Y.

[21] Appl. No.: 872,643

[22] Filed: Jun. 10, 1997

[30] Foreign Application Priority Data

Jun. 14, 1996 [EP] European Pat. Off. ............ 962016770

[51] Int. Cl.$^6$ .............................. H01G 4/06; H01G 4/20; H01G 4/228
[52] U.S. Cl. ................................ 361/321.4; 361/321.2; 361/305; 501/136; 501/137
[58] Field of Search .................. 361/306.3, 311, 361/312, 313, 306.1, 308.1, 320, 321.1, 321.2, 321.3, 321.4, 321.5; 501/137, 136; 156/89

[56] References Cited

U.S. PATENT DOCUMENTS

| | | | |
|---|---|---|---|
| 4,800,459 | 1/1989 | Takagi et al. ........................ | 361/321.2 |
| 5,208,727 | 5/1993 | Okamoto et al. .................... | 361/321.4 |
| 5,248,640 | 9/1993 | Sano et al. ............................ | 501/137 |
| 5,264,402 | 11/1993 | Sano et al. ............................ | 501/137 |
| 5,319,517 | 6/1994 | Nomura et al. ..................... | 361/321.4 |
| 5,659,456 | 8/1997 | Sano et al. ........................... | 361/321.4 |

FOREIGN PATENT DOCUMENTS 96201677  6/1997  European Pat. Off. ......... H01G 1/00

*Primary Examiner*—Bot L. Ledynh
*Assistant Examiner*—Anthony Dinkins
*Attorney, Agent, or Firm*—Norman N. Spain

[57] ABSTRACT

A ceramic multilayer capacitor includes a number of ceramic layers on the basis of a doped $BaTiO_3$ and a number of electrode layers of Ni. The ceramic layers and the electrode layers are alternately stacked to form a multilayer structure which is provided with electric connections at both side faces. The composition of the main component of the doped $BaTiO_3$ corresponds to the formula
$(Ba_{1-a-b}Ca_aSr_b)(Ti_{1-c-d-e-f}Zr_cAl_dMn_eNb_f)_kO_{3+\delta}$
wherein:

$0.02 \leq a \leq 0.08$
$0.002 \leq b \leq 0.03$
$0.15 \leq c \leq 0.20$
$0.00 < d \leq 0.03$
$0.001 \leq e \leq 0.02$
$0.0005 \leq f \leq 0.01$
$1.001 \leq k \leq 1.005$.

4 Claims, 1 Drawing Sheet

CERAMIC MULTILAYER CAPACITOR

BACKGROUND OF THE INVENTION

The invention relates to a ceramic multilayer capacitor comprising a number of ceramic layers on the basis of a doped $BaTiO_3$ as well as a number of electrode layers of Ni, the ceramic layers and the electrode layers being alternately stacked to form a multilayer structure which is provided with electric connections at two side faces, said electric connections being connected to a number of the electrode layers. The invention also relates to a ceramic material which can suitably be used in a ceramic multilayer capacitor. The invention further relates to a method of manufacturing a ceramic multilayer capacitor.

Ceramic multilayer capacitors of the type mentioned in the opening paragraph are known per se. They are described, inter alia, in U.S. Pat. No. 5,319,517. This patent discloses, more particularly, a multilayer capacitor whose ceramic layers are made predominantly of a material which is based on doped $BaTiO_3$. This material has a so-called perovskite structure. In the case of the known material, specific quantities of Ca ions and Sr ions are substituted at the Ba sites of the perovskite structure, and a specific quantity of Zr ions is substituted at the Ti sites. The electrode layers of the known capacitor consist predominantly of Ni. In the manufacture of the capacitor, sintering aids are added to reduce the minimum sintering temperature of the ceramic material. A relatively low sintering temperature is necessary to prevent the Ni of the electrode layers from melting during the sintering process.

The known ceramic multilayer capacitor has a disadvantage. It has been found that, in practice, the indicated composition does not lead to optimum properties of the capacitor. In particular the addition of sintering aids during the manufacture of these capacitors is considered to be a disadvantage. Such additions complicate the production process. In addition, they may adversely affect the properties of the ceramic multilayer capacitor.

SUMMARY OF THE INVENTION

It is an object of the invention to obviate the above disadvantages. The invention more particularly aims at providing a ceramic multilayer capacitor comprising electrode layers of Ni, which can be sintered without sintering aids at a relatively low temperature, for example, of approximately 1300° C. or less. It is an additional object of the invention to provide a ceramic material having a relatively low minimum sintering temperature of approximately 1300° C. or less, which can suitably be used in a ceramic multilayer capacitor. A further object of the invention is to provide a method of manufacturing a ceramic multilayer capacitor of the above-mentioned type.

These and other objects of the invention are achieved by a ceramic multilayer capacitor of the type mentioned in the opening paragraph, which is characterized in that the composition of the main component of the doped $BaTiO_3$ corresponds to the formula $(Ba_{1-a-b}Ca_aSr_b)(Ti_{1-c-d-e-f}Zr_cAl_dMn_eNb_f)_kO_{3+\delta}$ wherein:

$0.02 \leq a \leq 0.08$ $0.002 \leq b \leq 0.03$ $0.15 \leq c \leq 0.20$ $0.00 < d \leq 0.03$ $0.001 \leq e \leq 0.02$ $0.0005 \leq f \leq 0.01$ $1.001 \leq k \leq 1.005$ Surprisingly, it has been found that, without any sintering aid, ceramic compositions in accordance with the invention exhibit a relatively low sintering temperature. This temperature is below 1300° C. By means of further research it has been established that the ratio of the number of Ti sites to the number of Ba sites in the ceramic material is of essential importance in this respect. This Ti/Ba ratio is indicated by the index k. This index must range between 1.001 and 1.005.

It has been found that the sintering temperature of ceramic material having the above composition increases substantially if k is chosen to be smaller than 1.001. The sintering temperature increases even to temperatures in excess of 1400° C. if k is chosen to be smaller than 1.001. At a value of k in excess of 1.005, a number of the acceptor dopings used is insufficiently incorporated in the perovskite structure of $BaTiO_3$. As a result, the number of acceptor dopings present can no longer fully compensate for the number of conducting electrons, which are formed by the oxygen vacancies. Consequently, the ceramic material acquires semiconductive properties. This is very undesirable if this ceramic material is to be used in multilayer capacitors. The lowest sintering temperatures are achieved by means of the above-mentioned ceramic composition in which k ranges between 1.002 and 1.004. These compositions can even be sintered at temperatures below 1250° C.

Further experiments have rendered it plausible that during sintering of the inventive ceramic composition, liquid phases are formed if k is chosen to be within the above-mentioned range. These liquid phases cause a reduction of the sintering temperature of the ceramic material. Two important liquid phases could be characterized as $BaAl_2O_4$ and $Ba_6Ti_{17}O_{40}$. The melting temperature of these phases lies in the range from 1250° to 1260° C. It has further been found that these desirable liquid phases are not formed, or to an insufficient degree, if k is smaller than 1.001. It is noted that in the case of the known ceramic multilayer capacitor, the value of k is chosen in the range between 0.980 and 1.000. Consequently, to manufacture the known capacitors, sintering aids such as $Al_2O_3$ are necessary to achieve the necessary reduction of the sintering temperature.

The incorporation of dopants in $BaTiO_3$ is necessary to render the inventive material suitable for use as a dielectric material in a ceramic multilayer capacitor. In the present case, Ca and Sr ions are incorporated in the Ba sites and Zr, Al, Mn and Nb ions are incorporated in the Ti sites of the $BaTiO_3$ material. It is noted that the indicated quantities of dopants are calculated as parts of the overall quantity of available Ba and Ti sites in this material.

The presence of Ca and Sr in the indicated quantities at the Ba sites of the ceramic material is regarded as an essential prerequisite to obtain properly functioning ceramic multilayer capacitors. It has been found that dense sintering of the ceramic material is affected by the presence of Sr. If the quantity of Sr is below 0.002 parts, the ceramic material cannot be sintered sufficiently densely. If the quantity of Sr in the ceramic material exceeds 0.03 parts, the dielectric constant of the material decreases too much. An optimum compromise between both undesirable effects is obtained if the quantity of Sr at the Ba sites of the ceramic material ranges between 0.01 and 0.02 parts.

The presence of Ca serves to widen the dielectric peak of the ceramic material. A quantity below 0.02 parts of Ca leads to a widening of the peak which is too small. A quantity above 0.08 parts of Ca in the ceramic material leads to a dielectric constant of said material which is too low. An optimum compromise between both undesirable effects is achieved if the quantity of Ca at the Ba sites of the ceramic material ranges between 0.03 and 0.05 parts.

The presence of Zr, Al, Mn and Nb in the indicated quantities at the Ti sites of the ceramic material is also regarded as an essential prerequisite to obtain a properly functioning multilayer capacitor. The presence of Zr causes the maximum value of the dielectric constant (the Curie temperature) of $BaTiO_3$ to shift to a lower temperature range. If the quantity of Zr is less than 0.15 parts or more than 0.20 parts, the Curie temperature is too high or too low, respectively. This leads to too low a dielectric constant at the operating temperature (=room temperature) of the material. If the quantity of Zr ranges between 0.17 and 0.18 parts, the position of the Curie temperature is optimally chosen.

The presence of Al is important, inter alia, for the formation of one or more liquid phases during sintering of the ceramic material. In addition, Al plays a part in the protection of $BaTiO_3$ against reduction, which may occur during sintering of the material. It has been found that the ability of Al to protect against reduction occurs, in particular, in the grain boundaries of the material. If more than 0.03 parts of Al are present in the material, the quantity of foreign phases formed becomes undesirably large. This leads to an undesirable reduction of the dielectric constant. The quantity of Al is preferably chosen to range between 0.0010 and 0.0025 parts.

Mn also plays an important part in the sintering of the ceramic material of the multilayer capacitor in accordance with the invention. This sintering process takes place in a reducing gas. During sintering, reduction of $BaTiO_3$ may occur. This leads to a reduction of the resistance of the ceramic material formed in the sintering process. This is undesirable. In experiments it has been established that the presence of a specific quantity of Mn at Ti sites of the ceramic material can preclude this undesirable reduction of the ceramic material. Unlike Al, the ability of Mn to protect against reduction occurs, in particular, in the grains of the ceramic material. If the ceramic material contains less than 0.001 parts of Mn, the protective effect occurs insufficiently. If the quantity of Mn exceeds 0.02 parts, the service life of the ceramic is reduced considerably. An optimum compromise between both undesirable properties is achieved at an Mn quantity which ranges between 0.002 and 0.010 parts.

The ceramic material of the multilayer capacitor in accordance with the invention should also contain a small quantity of Nb. The presence of this element has a positive effect on the service life of the ceramic material. This service life is measured by means of highly accelerated life tests (HALT). If the material contains less than 0.0005 parts of Nb, the service life-extending effect is insufficient. If the material contains more than 0.01 parts of Nb, the electric resistance of the material decreases. This is undesirable. Preferably, the quantity of Nb is chosen in the range between 0.001 and 0.005 parts.

As there is an unequal number of Ti sites and Ba sites (k is unequal to one), the number of O sites is not equal to 3. The deviation from 3 is indicated in the formula by $\delta$. The factor $\delta$ has a value which is chosen so that the main component is electrically neutral.

The invention also relates to a novel ceramic composition on the basis of doped $BaTiO_3$. In accordance with the invention, this composition is characterized in that the composition of the main component corresponds to the formula $(Ba_{1-a-b}Ca_aSr_b)(Ti_{1-c-d-e-f}Zr_cAl_dMn_eNb_f)_kO_{3+\delta}$ wherein:

$0.02 \leq a \leq 0.08$ $0.002 \leq b \leq 0.03$ $0.15 \leq c \leq 0.20$ $0.00 < d \leq 0.03$ $0.001 \leq e \leq 0.02$ $0.0005 \leq f \leq 0.01$ $1.001 \leq k \leq 1.005$ Ceramic compositions which correspond to this formula can very advantageously be used in ceramic capacitors, in particular ceramic multilayer capacitors comprising electrode layers of Ni. The metal content of such electrode layers consists minimally of 90 wt. %, preferably minimally 98 wt. %, of Ni. Preferably, $1.002 \leq k \leq 1.004$. For the reasons described hereinabove, preferably also the following applies: $0.03 < a < 0.05$; $0.01 < b < 0.02$; $0.17 < c < 0.18$; $0.001 < d < 0.0025$; $0.002 < e < 0.010$ and/or $0.001 < f < 0.005$.

The invention also relates to a method of manufacturing ceramic multilayer capacitors, in which ceramic fails on the basis of a doped $BaTiO_3$ are provided with screen-printed electrode layers of Ni, whereafter the ceramic layers and the electrode layers are alternately stacked to form a multilayer structure which is subsequently calcined and sintered in a reducing atmosphere, after which the multilayer structure is provided with electric connections, which are connected to a number of said electrode layers. In accordance with the invention, this method is characterized in that the composition of the main component of the doped $BaTiO_3$ corresponds to the formula $(Ba_{1-a-b}Ca_aSr_b)(Ti_{1-c-d-e-f}Zr_cAl_dMn_eNb_f)_kO_{3+\delta}$ wherein:

$0.02 \leq a \leq 0.08$ $0.002 \leq b \leq 0.03$ $0.15 \leq c \leq 0.20$ $0.00 < d \leq 0.03$ $0.001 \leq e \leq 0.02$ $0.0005 \leq f \leq 0.01$ $1.001 \leq k \leq 1.005$ and in that no sintering aids are added to the doped $BaTiO_3$. For the reasons described hereinabove, preferably the following applies: $0.03 < a < 0.05$; $0.01 < b < 0.02$; $0.17 < c < 0.18$; $0.001 < d < 0.0025$; $0.002 < e < 0.010$ and/or $0.001 < f < 0.005$.

As stated hereinabove, ceramic compositions in accordance with the invention, which do not contain any sintering aid, exhibit a relatively low sintering temperature. The ratio of the number of Ti sites to the number of Ba sites is of essential importance in this respect. This ratio is indicated by the index k. This index must range between 1.001 and 1.005.

The sintering temperature of a ceramic material having the above composition is found to increase substantially if k is chosen to be smaller than 1.001. If k of the ceramic material in accordance with the invention is chosen to be above 1.005, the ceramic material exhibits semiconductive properties. This is undesirable if this ceramic material is to be used in multilayer capacitors. The lowest sintering temperatures are achieved if the above-mentioned ceramic composition is used in which k ranges between 1.002 and 1.004. If the ratio of the doped ions at the Ba sites to the doped ions at the Ti sites is chosen to be within the ranges indicated by k, then an agent for reducing the sintering temperature during sintering, such as $Al_2O_3$ or $SiO_2$, does not have to be added to the ceramic composition.

These and other aspects of the invention will be apparent from and elucidated with reference to the embodiments described hereinafter.

Figure 1:
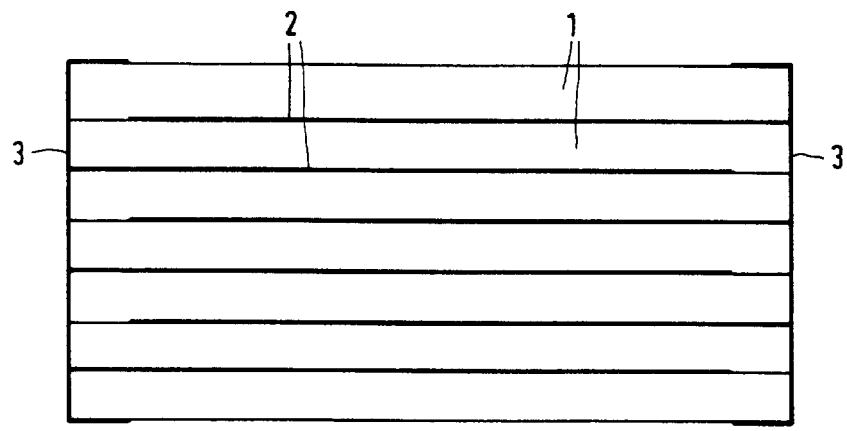
FIG. 1 is a schematic, sectional view of a capacitor in accordance with the invention.

It is noted that, for clarity, the parts shown in the FIG. 1 are not drawn to scale.

DETAILED DESCRIPTION OF THE INVENTION

The invention will now be described in greater detail with reference to the figures of the drawing.

FIG. 1 shows a multilayer capacitor in accordance with the invention. This capacitor comprises a number of ceramic layers 1 on the basis of a doped $BaTiO_3$. The exact composition is $(Ba_{0.942}Ca_{0.04}Sr_{0.018})(Ti_{0.8125}Zr_{0.178}Al_{0.002}Mn_{0.005}Nb_{0.0025})_k O_{3+\delta}$. The value of k was varied between 0.999 and 1.005. The capacitor also comprises a number of electrode layers 2 which consist of Ni. The capacitor additionally has two electric connections 3 which, in this case, are provided on two oppositely located side faces of the capacitor. These connections contain a solderable material, for example copper. In practice, the electrode layers are provided on a ceramic foil by means of screen printing, whereafter a number of these screen-printed foils are stacked. As shown in this figure, the ceramic foils are stacked so that successive electrode layers are connected alternately to the one or the other electric connection.

For clarity, only 6 electrode layers are shown in FIG. 1. In practice, ceramic multilayer capacitors comprise minimally ten and maximally several hundred electrode layers. Their thickness typically ranges from approximately 0.5 to 2.0 micrometers. The thickness of the ceramic foils typically ranges from 5 to 20 micrometers. In practice, the capacitors are provided with a protective layer (not shown) on the upper side and the lower side of the stacked, printed foils. This protective layer is usually composed of a number of unprinted ceramic foils which, during stacking of the printed foils, are incorporated in the stack.

The ceramic multilayer capacitors in accordance with the invention are manufactured as follows: First, a powder mixture is prepared by mixing powders of oxides and/or carbonates of the desired metals in quantities corresponding to the intended composition. This powder mixture is suspended in an aqueous solution to which a small quantity of a dispersing agent is added. The suspension is ground in a continuous attrition mill for several hours, so that powder particles having an average size below 0.4 micrometer are obtained. Subsequently, the powder is dried.

Next, the dried powder is calcined in air for several hours at approximately 1100° C. This results in the desired, doped $BaTiO_3$. This is then ground for several hours. The powder thus formed has an average particles size below 1.0 micrometer. A binder solution is added to this powder. Subsequently, green, ceramic foils having a thickness of, for example, 40 micrometers are drawn from this powder-binder mixture. Electrode layers are screen printed on these foils by means of techniques which are known per se. For this purpose, use is made of a screen-printing paste which contains metal particles which are predominantly composed of Ni. The metal content of such a paste consists for at least 90 wt. %, preferably at least 98 wt. %, of Ni. The layer thickness of the non-sintered electrode layers is approximately 2 micrometers.

Subsequently, printed foils having a desired size are stacked. The foils are stacked in such a manner that the electrode layers of the even layers and of the odd layers are slightly displaced relative to each other. The stacked foils are uniaxially subjected to a high pressure (approximately 300 bar) at an increased temperature (approximately 80° C.) to form a multilayer structure. This structure is subsequently broken in one direction to form rods and in a second direction (at right angles to the first direction) to form separate multilayer-capacitor bodies. These bodies are sintered in a reducing atmosphere of hydrogen in a water-saturated nitrogen atmosphere.

Finally, two oppositely located surfaces of the multilayer-capacitor bodies are provided with electric connections of copper by means of dip coating. These connections are galvanically reinforced and provided with a solderable NiSn alloy. The mechanical and electrical properties of the ceramic multilayer capacitors thus produced can be subsequently measured.

In a first experiment, a series of multilayer capacitors based on doped $BaTiO_3$ were manufactured as described hereinabove. The composition of the main component of the ceramic layers corresponded to the formula $(Ba_{0.942}Ca_{0.04}Sr_{0.018})(Ti_{0.8125}Zr_{0.178}Al_{0.002}Mn_{0.005}Nb_{0.0025})_k O_{3+\delta}$. The value of k was varied between 0.999 and 1.005.

The ceramic multilayer capacitors were sintered in a reducing atmosphere (1 vol. % hydrogen in 99 vol. % water-saturated nitrogen). Finally, the capacitors were subjected to a reoxidation treatment at 1000° C. In a series of experiments, the minimum sintering temperature necessary to attain a density of at least 99% of the theoretical X-ray density (5.95 g/cm$^3$) in a three-hours sintering process was determined. The results of these experiments are graphically shown in FIG. 2.

Figure 2:
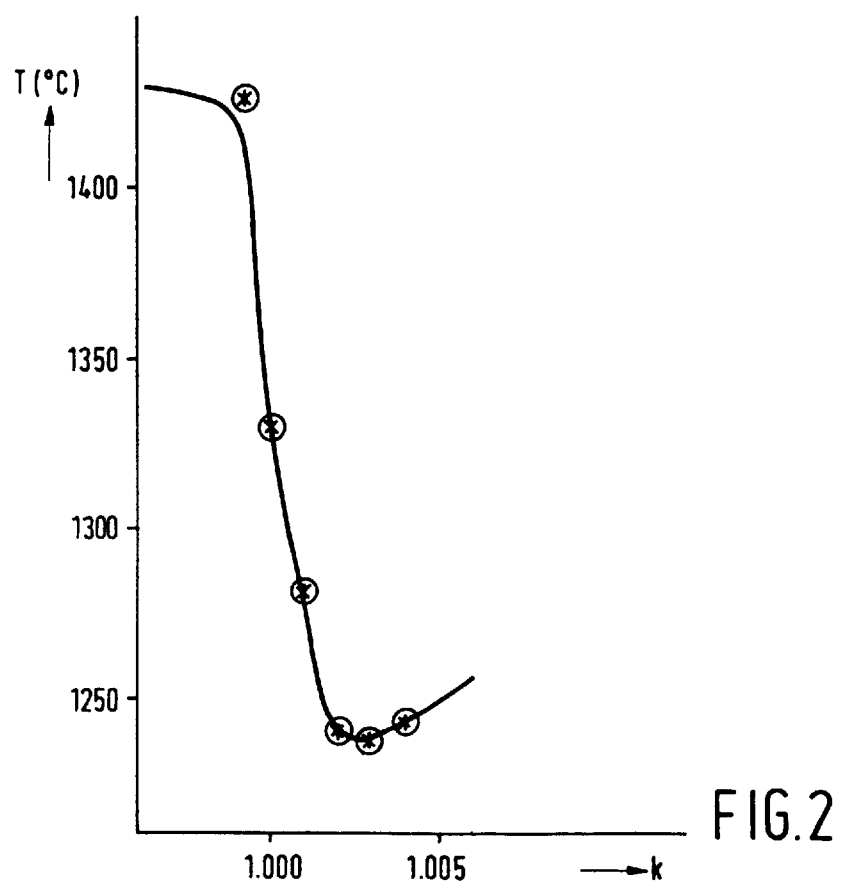
FIG. 2 shows a graph in which the minimum sintering temperature of a ceramic material on the basis of doped $BaTiO_3$ is plotted as a function of the value of k.

FIG. 2 shows that at values of k in excess of 1.001, said ceramic material has a much lower sintering temperature than at smaller values of k. Further measurements showed that k values in excess of 1.005 cause the insulation resistance of the ceramic material to decrease drastically. Under these conditions, the dielectric material acquires semiconductive properties. By virtue of the lower sintering temperature of the materials having k values between 1.001 and 1.005, these materials could be used, without sintering aids, in multilayer capacitors having Ni electrodes.

A number of electrical properties were determined of multilayer capacitors having Ni electrodes whose ceramic layers had the above-mentioned composition (k value of 1.003). It was found that the dielectric constant amounted approximately to 15.500. The dielectric losses of the material (tan $\delta$) were smaller than 5%. Under HALT (highly accelerated life test) conditions (100 hours at 140° C. and a field strength of 20 V per micrometer of thickness of the dielectric) the service life of this capacitor amounted to more than 50 hours. The capacitor was found to meet the so-called Y5V specification.

In further experiments, the quantities of Ca and Sr ions at Ba sites as well as the quantites of Zr, Al, Mn and Nb ions at Ti sites were varied around the above-mentioned composition. It was found that the above-mentioned composition is optimally suitable for use in ceramic multilayer capacitors having electrode layers which consist predominantly of Ni.

We claim:

1. A ceramic multilayer capacitor comprising a number of ceramic layers of a doped $BaTiO_3$ as well as a number of electrode layers of Ni, the ceramic layers and the electrode layers being alternately stacked to form a multilayer structure which is provided with electric connections at two side faces, said electric connections being connected to a number of the electrode layers, characterized in that the doped $BaTiO_3$ comprises a main component having a composition that corresponds to the formula
$(Ba_{1-a-b}Ca_aSr_b)(Ti_{1-c-d-e-f}Zr_cAl_dMn_eNb_f)_kO_{3+\delta}$
wherein:

$0.02 \leq a \leq 0.08$
$0.002 \leq b \leq 0.03$
$0.15 \leq c \leq 0.20$
$0.00 < d \leq 0.03$
$0.001 \leq e \leq 0.02$
$0.0005 \leq f \leq 0.01$
$1.001 \leq k \leq 1.005$ and $\delta$ being such that said composition is electrically neutral.

2. A ceramic multilayer capacitor as claimed in claim 1, characterized in that $1.002 \leq k \leq 1.004$.

3. A ceramic composition of the formula
$(Ba_{1-a-b}Ca_aSr_b)(Ti_{1-c-d-e-f}Zr_cAl_dMn_eNb_f)_kO_{3+\delta}$
wherein:

$0.02 \leq a \leq 0.08$
$0.002 \leq b \leq 0.03$
$0.15 \leq c \leq 0.20$
$0.00 < d \leq 0.03$
$0.001 \leq e \leq 0.02$
$0.0005 \leq f \leq 0.01$
$1.001 \leq k \leq 1.005$ and $\delta$ being such that said composition is electrically neutral.

4. A ceramic composition as claimed in claim 3, characterized in that $1.002 \leq k \leq 1.004$.

* * * * *